United States Patent
Habicht et al.

(10) Patent No.: US 11,065,916 B2
(45) Date of Patent: Jul. 20, 2021

(54) PNEUMATIC VEHICLE TIRE

(71) Applicant: Continental Reifen Deutschland GmbH, Hannover (DE)

(72) Inventors: Stefan Habicht, Hannover (DE); Werner Holste, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 534 days.

(21) Appl. No.: 15/872,738

(22) Filed: Jan. 16, 2018

(65) Prior Publication Data
US 2018/0141384 A1 May 24, 2018

Related U.S. Application Data

(63) Continuation of application No. PCT/EP2016/052677, filed on Feb. 9, 2016.

(30) Foreign Application Priority Data

Jul. 16, 2015 (DE) .......................... 102015213403.2

(51) Int. Cl.
*B60C 11/01* (2006.01)
*B60C 13/00* (2006.01)
(Continued)

(52) U.S. Cl.
CPC ................ *B60C 11/01* (2013.01); *B60C 3/04* (2013.01); *B60C 9/0292* (2013.01); *B60C 13/00* (2013.01);
(Continued)

(58) Field of Classification Search
CPC ........................... B60C 11/01; B60C 15/0009; B60C 2015/009
See application file for complete search history.

(56) References Cited

U.S. PATENT DOCUMENTS

2010/0212801 A1* 8/2010 Matsunaga ............. B60C 13/04
152/525
2013/0075004 A1 3/2013 Horiuchi
(Continued)

FOREIGN PATENT DOCUMENTS

EP 2818332 A1 12/2014
JP 3032754 B1 4/2000

OTHER PUBLICATIONS

International Search Report dated Apr. 29, 2016 of international application PCT/EP2016/052677 on which this application is based.

*Primary Examiner* — Timothy Kennedy
*Assistant Examiner* — Alexander A Wang
(74) *Attorney, Agent, or Firm* — Gregory Adams; David L. Cate

(57) ABSTRACT

A pneumatic vehicle tire has a nominal tire cross-sectional height H of at most 110 mm, bead regions with bead cores, a radial carcass which runs around the bead cores in the bead regions axially on the inside to axially on the outside forming carcass turn-ups, and side wall regions, which each have a wing profile and a side wall profile. The wing profiles are the only rubber components extending in contact with the radial carcass in the radially outer region of the side wall region. The carcass turn-ups end at a radial height ($h_1$), determined from a base line, of 15 mm to 65 mm. At least in a region between a radial height ($h_2$) of 29% of the nominal side wall height and a radial height ($h_3$) of at least 80% of the height H, the wing profiles are the only rubber components that extend outside the radial carcass.

9 Claims, 1 Drawing Sheet

(51) Int. Cl.
  *B60C 3/04* (2006.01)
  *B60C 9/02* (2006.01)
  *B60C 13/04* (2006.01)

(52) U.S. Cl.
  CPC ........ *B60C 13/04* (2013.01); *B60C 2011/016* (2013.01); *B60C 2013/045* (2013.01)

(56) References Cited

U.S. PATENT DOCUMENTS

| | | |
|---|---|---|
| 2014/0027034 A1 | 1/2014 | Molzow-Voit et al. |
| 2017/0072750 A1* | 3/2017 | Munezawa ......... B60C 15/0607 |

* cited by examiner

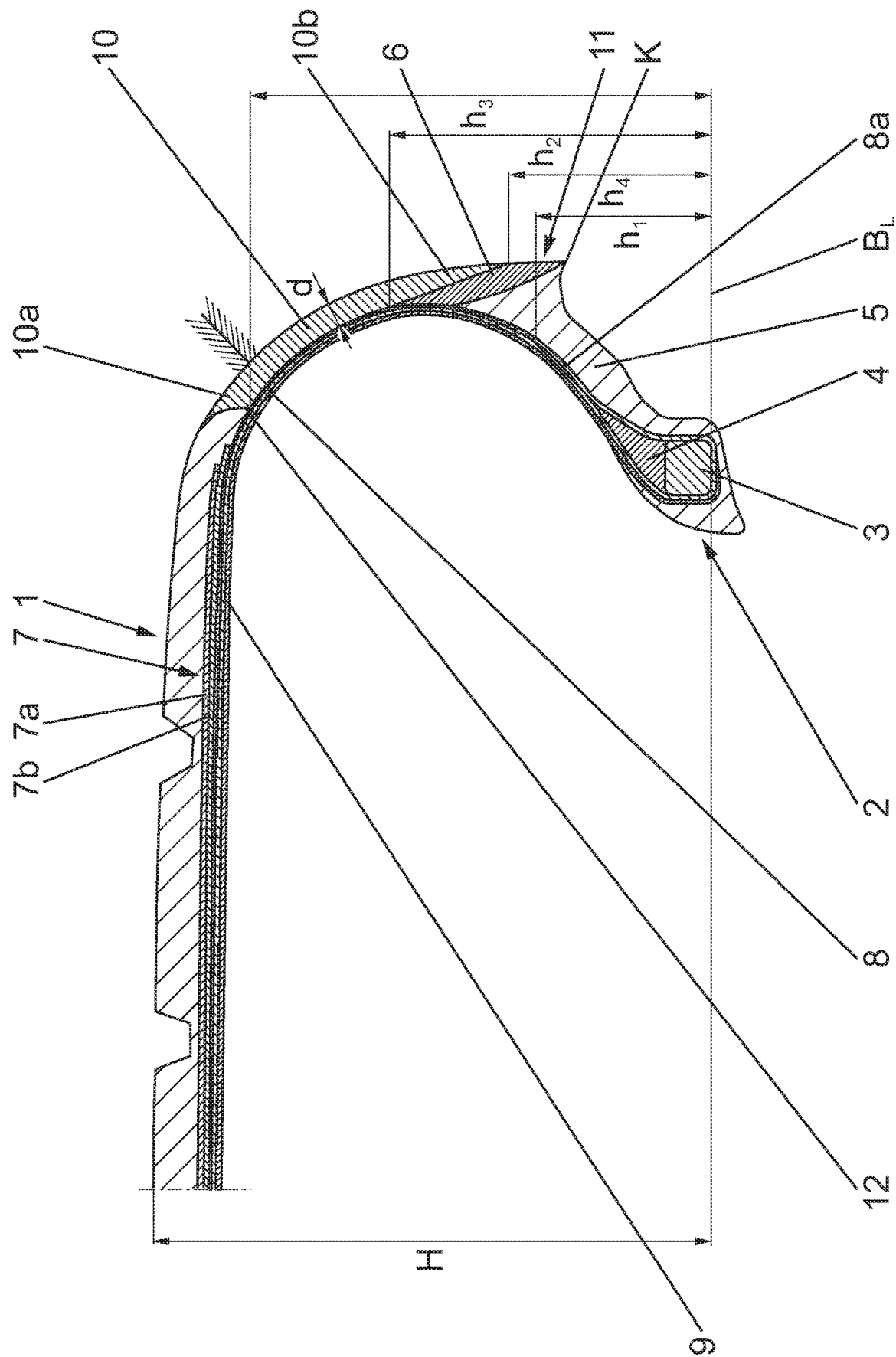

PNEUMATIC VEHICLE TIRE

CROSS REFERENCE TO RELATED APPLICATIONS

This application is a continuation application of international patent application PCT/EP2016/052677, filed Feb. 9, 2016 designating the United States and claiming priority from German application 10 2015 213 403.2, filed Jul. 16, 2015, and the entire content of both applications is incorporated herein by reference.

FIELD OF THE INVENTION

The invention relates to a pneumatic vehicle tire having a nominal tire cross-sectional height of at most 110 mm, having a tread, a belt assembly, bead regions with bead cores and horn profiles, a radial carcass, which runs around the bead cores in the bead regions axially on the inside to axially on the outside, forming carcass turn-ups, and having side wall regions, which each have a wing profile and a side wall profile, wherein the wing profile is the only rubber component extending in contact with the radial carcass in the radially outer region of the side wall region and has a radially inner end section which runs out in a tapered manner in the direction of the bead region and which overlaps the side wall profile on the outside, and has a radially outer end section, which runs out at the tread edge region, and wherein, in cross section, the side wall profile is a substantially strip-shaped rubber component arranged between the wing profile and the horn profile.

BACKGROUND OF THE INVENTION

Such a pneumatic vehicle tire is known from US2014/0027034. In the case of this pneumatic vehicle tire, the wing profiles are the only rubber components that extend in the radially outer regions of the side walls, and therefore the rubber thickness in these regions can be kept less than in embodiments in which the side wall profiles and wing profiles overlap in this region. In the case of this known tire, provision is furthermore made for the turn-ups of the radial carcass to be folded back so as to extend under the belt assembly. However, this known tire has such a high radial stiffness in the side wall regions that it is in need of improvement in respect especially of its handling characteristics and of the road noise transmitted into the interior of the vehicle.

SUMMARY OF THE INVENTION

It is an object of the invention to eliminate the above mentioned disadvantages and furthermore to enable the pneumatic vehicle tire to be made even slimmer in the side wall regions.

The object can, for example, be achieved by virtue of the fact that the carcass turn-ups end at a radial height, determined from a base line, of 15 mm to 65 mm, and that, at least in a region between a radial height, determined from the base line, of 29% of the nominal side wall height and a radial height, determined from the base line, of at least 80% of the tire cross-sectional height, the wing profiles are the only rubber components that extend outside the radial carcass, wherein the base line extends in the axial direction and intersects the rim where the outer end of the rim radius is situated.

In the case of a tire embodied in accordance with the invention, the head region of the tire is to a large extent mechanically decoupled from the bead regions of the tire, especially as a result of the lower radial stiffness that can be achieved in the side wall regions. The carcass turn-ups ending at a relatively low height and the relatively large region within which only the wing profiles extend as rubber components are responsible for the decoupling. The folding back of the carcass turn-ups under the belt assembly—the term "C ply" being used here—which is provided in the embodiment known from US2014/0027034, results in increased shoulder pressure of the tire in the ground contact area in the sensitive shoulder regions. This increased shoulder pressure can also result in increased shoulder abrasion.

In the case of tires embodied in accordance with the invention, the wing profiles can furthermore be made very thin, thus further reducing the radial side wall stiffness. Pneumatic vehicle tires with a low side wall thickness have better handling characteristics since they can deflect to a greater extent. This increases, in particular, the dynamic ground contact area of the tire, this being associated with better power transmission and therefore improved handling characteristics. The mechanical decoupling already mentioned furthermore has the effect of reducing tire noise in the interior of the vehicle. By virtue of the possibility of reducing the rubber thickness in the side wall regions even further, it is additionally possible to achieve a weight saving, which results in a significant improvement in the rolling resistance of the tire.

An embodiment of the invention in which, from a height of 25% of the nominal side wall height, the wing profiles are the only rubber components that extend outside the radial carcass, is particularly preferred. In the direction of the tread up to a height of up to 90% of the tire cross-sectional height, the wing profiles are in this case preferably the only rubber components that extend outside the radial carcass. This embodiment is advantageous for particularly effective reduction of the radial side wall stiffness.

According to another advantageous embodiment, the thickness of the wing profiles perpendicularly to the extent of the radial carcass in those side wall regions in which they are the only rubber components extending outside the radial carcass is 1.0 mm to 3.5 mm, in particular up to 2.5 mm. A thickness of the wing profiles in these regions of 1.5 mm to 1.8 mm is particularly advantageous. In this case, the thickness of the wing profiles in these side wall regions should be substantially constant.

In each side wall region, the side wall profile, the radially outer end section of the horn profile and the wing profile can furthermore advantageously form a rim protection rib, the maximum thickness of which perpendicularly to the extent of the radial carcass is 4.0 mm to 14.0 mm.

BRIEF DESCRIPTION OF THE DRAWING

The invention will now be described with reference to the single FIG. of the drawing (FIG. 1) which shows a cross section of half of a pneumatic vehicle tire.

DESCRIPTION OF THE PREFERRED EMBODIMENTS OF THE INVENTION

The size and dimension figures given herein refer to a tire mounted on a standard rim under a standard internal pressure but in the no-load state in accordance with E.T.R.T.O. standards in the current version. The radial distances or heights are determined from a base line $B_L$, which extends in the axial direction and intersects the rim where the outer end of the rim radius is situated. The nominal width should be understood to be the nominal width in millimeters given in the tire dimension figures in accordance with the E.T.R.T.O. standards. Thus, in the tire dimension "235/35R19", for example, the number 235 is the nominal width in millimeters and the number 35 is the nominal aspect ratio. According to this example, 35% of the nominal width of the tire therefore corresponds to the nominal side wall height, and this is therefore 82.25 mm in this example. Pneumatic vehicle tires embodied in accordance with the invention are passenger car tires of radial configuration with nominal side wall heights of up to 110 mm.

The pneumatic vehicle tire shown in section in FIG. 1 has a tread 1, bead regions 2 with bead cores 3, a one- or multi-part apex (core profile) 4 and a horn profile 5, and furthermore side wall profiles 6, a belt assembly 7, a radial carcass 8 and an airtight inner layer 9. As will be described below in detail, a wing profile 10 extends over each of the side wall regions of the pneumatic vehicle tire.

The apex 4, the horn profile 5, the side wall profile 6 and the wing profile 10 are rubber profiles, which can be produced from the usual rubber compounds for these components.

The tread 1, which is not the subject matter of the invention, can be embodied or constructed in a known manner, for example, in a single layer or in two layers with a tread base and a tread cap. The tread 1 is furthermore provided in a manner which is known but not shown with tread profiling and is produced by coextrusion together with the two wing profiles 10, which overlap with the tread edge regions. Generally, the wing profiles 10 are composed of the same rubber compound as the side wall profiles 6. However, the rubber compound of the wing profiles 10 can also differ from that of the side wall profiles 6.

In a known manner, the radial carcass 8 has at least one ply composed of rubberized cords, in particular rubberized textile cords, which extend at least substantially in a radial direction. The carcass 8, which in each case extends from axially on the inside to axially on the outside around the bead cores 3, extends with its turned-over sections, the turn-ups 8a, to a height $h_1$ of 15 mm to 65 mm.

The bead assembly 7 has at least two belt plies 7a, 7b with strengthening members, in particular steel cords, which cross each other but run parallel in each ply. The belt plies 7a, 7b can be covered by a single- or multi-ply bandage (not shown), which consists in a known manner of bandage cords, for example, nylon cords, embedded in rubber and extending substantially in the circumferential direction.

Together with the side wall profile 6 and the wing profile 10, that section of the horn profile 5 which extends axially outside the carcass turn-up 8a or carcass ply 8 forms a rim protection rib 11 having an edge K running around in a ring shape along the side wall region at the thickest point of the protection rib 11. The side wall region radially outside the edge K has a concavely rounded outer contour and, radially inside the edge K, a convexly curved section along the radially outer region of the horn profile 5. The greatest rubber thickness in the region of the rim protection rib 11, determined perpendicularly to the extent of the carcass 8, is between 4 mm and 14 mm.

The wing profile 10 extends from the tread 1, via the shoulder region of the tire, along the side wall region and has two end sections 10a, 10b, which externally overlap the adjoining components. End section 10a overlaps the tread edge region, and end section 10b overlaps the side wall profile 6. At least between a height $h_2$ of 29% of the nominal side wall height of the pneumatic vehicle tire concerned and the boundary 12, situated on the carcass 8, between the wing profile 10 and the tread 1, the wing profile 10 is the only rubber component extending outside the carcass 8. The wing profiles 10 are preferably the only rubber components from a height $h_2$ of 25% of the nominal side wall height. The boundary 12 is situated at a height $h_3$ of 80% to 90% of the cross-sectional height H. Radially outside this boundary 12, end section 10a runs out along the tread 1 with a substantially continuous reduction in its thickness but does not protrude into the region of the ground contact area of the tread 1. Starting at height $h_2$, end section 10b of the wing profile 10 extends in the direction of the bead region 2, wherein end section 10b has a decreasing thickness on the outside of the side wall profile 6 and runs out along the side wall profile 6. The radially inner end of end section 10b of the wing profile 10 is situated at a height $h_4$ of 20% to 25% of the nominal side wall height and radially outside the edge K. The side wall profile 6 is of substantially strip-shaped configuration in cross section, is situated between the horn profile 5 and end section 10b of the wing profile 10 and likewise has two relatively narrow tapering end sections, an end section running out along end section 10b of the wing profile 10 and an end section running out between the horn profile 5 and along the protection rib 11 as far as the edge K.

In each side wall region in which the wing profile 10 is the only rubber components extending outside the carcass ply 8, it has a thickness d of 1.0 mm to 3.5 mm, preferably up to 2.5 mm, in particular at least 1.5 mm and, in particular, at most 1.8 mm, at each point perpendicularly to the extent of the radial carcass 8. In this region, the thickness d of the wing profile 10 is largely constant but can also vary slightly, in particular by up to 0.2 mm.

Tires embodied in accordance with the invention have a lower radial stiffness in the side wall regions, this being associated with a number of advantageous effects, which are mentioned at the outset.

It is understood that the foregoing description is that of the preferred embodiments of the invention and that various changes and modifications may be made thereto without departing from the spirit and scope of the invention as defined in the appended claims.

LIST OF REFERENCE NUMBERS

1 Tread
2 Bead region
3 Bead core
4 Apex
5 Horn profile
6 Side wall profile
6a, 6b End section
7 Belt assembly
7a, 7b Belt ply
8 Radial carcass
8a Carcass turn-up
9 Inner layer
10 Wing profile
10a, 10b End section
11 Protective rib
12 Boundary
$B_L$ Base line
d Thickness
H Cross-sectional height
$h_1, h_2, h_3, h_4$ Height
K Edge

What is claimed is:

1. A pneumatic vehicle tire comprising:
   a tread including tread edge regions;
   the pneumatic vehicle tire having a nominal tire cross-sectional height (H) of at most 110 mm;
   a belt assembly;
   bead regions each having a bead core and horn profile;
   a radial carcass running around each bead core in each bead region axially on the inside to axially on the outside forming carcass turn-ups;
   side wall regions each having a wing profile and a side wall profile;
   said wing profiles being the only rubber components extending in contact with said radial carcass in radially outer regions of said side wall regions;
   said wing profiles each having a radially inner end section which runs out in a tapered manner in the direction of said bead regions and which overlaps corresponding side wall profiles on the outside;
   said wing profiles each further having respective radially outer end sections, which run out at corresponding ones of said tread edge regions;
   said side wall profiles each being, in cross section, a strip-shaped rubber component arranged between corresponding ones of said wing profiles and horn profiles;
   said carcass turn-ups ending at a radial height (h1) of 15 mm to 65 mm determined from a base line (BL);
   said wing profiles being, between a radial height (h2) determined from said base line (BL) of 29% of a nominal side wall height, and a radial height (h3) determined from said base line (BL) of at least 80% of said tire cross-sectional height (H); and,
   said base line (BL) extending in the axial direction and being configured to intersect a rim where an outer end of a rim radius is situated;
   the wing profiles are the only rubber components that extend outside the radial carcass; and
   the wing profiles are above the radial height h1 and have a constant thickness from the height h2 to the height h3.

2. The pneumatic vehicle tire of claim 1, wherein, in the direction of said tread up to said height (h3) of up to 90% of said tire cross-sectional height (H), said wing profiles are the only rubber components that extend outside said radial carcass.

3. The pneumatic vehicle tire of claim 1, wherein:
   said wing profiles have a thickness (d) perpendicular to the extent of said radial carcass in said side wall regions in which said wing profiles are the only rubber components extending outside the radial carcass; and,
   said sidewall thickness (d) lies in a range from 1.0 mm to 3.5 mm.

4. The pneumatic vehicle tire of claim 1, wherein:
   said wing profiles have a thickness (d) perpendicular to the extent of said radial carcass in said side wall regions in which they are the only rubber components extending outside the radial carcass; and,
   said sidewall thickness (d) is 2.5 mm.

5. The pneumatic vehicle tire of claim 1, wherein:
   said wing profiles have a thickness (d) perpendicular to the extent of said radial carcass in said side wall regions in which they are the only rubber components extending outside the radial carcass; and,
   said sidewall thickness (d) is at least 1.5 mm.

6. The pneumatic vehicle tire of claim 1, wherein:
   said wing profiles have a thickness (d) perpendicular to the extent of said radial carcass in said side wall regions in which they are the only rubber components extending outside the radial carcass; and,
   said sidewall thickness (d) is at most 1.8 mm.

7. The pneumatic vehicle tire of claim 1, wherein:
   said wing profiles have a thickness (d) perpendicular to the extent of said radial carcass in said side wall regions in which they are the only rubber components extending outside the radial 5 carcass; and,
   said sidewall thickness (d) is constant.

8. The pneumatic vehicle tire of claim 1, wherein:
   said horn profiles each have a radially outer horn profile end section;
   corresponding ones of said side wall profiles, said radially outer horn profile end sections and said wing profiles each form a rim protection rib in said side wall regions; and,
   said rim protection ribs each having, perpendicularly to the extent of the radial carcass, a maximum thickness lying in a range from 4 mm to 14 mm.

9. The pneumatic vehicle tire of claim 1, further comprising
   a boundary situated at the height h3, radially outside the boundary a first section of each of the wing profiles runs out along the tread with a continuous reduction in its thickness but does not protrude into the ground contact region of the tread;
   a second section of each of the wing profiles extends from the height h3 to the height h4 and has a decreasing thickness from the height h2 to the height h4;
   a rim protection rib having an edge K running around in a ring shape along each of the sidewall regions, where the edge K has a height from the base line (BL) of less than h1; and
   h3>h2, h2>h4, and h4>h1.

* * * * *